United States Patent
Hicks et al.

(10) Patent No.: US 8,662,195 B2
(45) Date of Patent: *Mar. 4, 2014

(54) APPARATUS FOR ADJUSTING TENSION AND POSITIONING OF A HARROWING CHAIN

(75) Inventors: Donnie Wayne Hicks, Lubbock, TX (US); Randy Joe Holloway, Lubbock, TX (US); Chad Phares, Lubbock, TX (US)

(73) Assignee: HHP Engineering Solutions International, Inc., Lubbock, TX (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/102,636

(22) Filed: May 6, 2011

(65) Prior Publication Data
US 2011/0203818 A1 Aug. 25, 2011

Related U.S. Application Data

(63) Continuation-in-part of application No. 12/631,500, filed on Dec. 4, 2009, now Pat. No. 7,963,345.

(51) Int. Cl.
*A01B 35/00* (2006.01)

(52) U.S. Cl.
USPC .......................................... 172/612; 172/579

(58) Field of Classification Search
USPC ......... 172/518, 527, 567, 568, 586, 311, 440, 172/441, 551, 576, 595, 583, 140, 776, 612
See application file for complete search history.

(56) References Cited

U.S. PATENT DOCUMENTS

| | | |
|---|---|---|
| 2,191,537 A | 2/1940 | Miller |
| 2,327,021 A | 8/1943 | Cushman |
| 2,363,228 A | 11/1944 | Cade |
| 2,825,983 A | 3/1958 | Finn |
| 2,914,125 A * | 11/1959 | Tanke et al. ....................... 172/8 |
| 3,327,787 A | 6/1967 | Adee |
| 4,893,682 A | 1/1990 | Smallacombe |
| 2,363,229 A | 11/1994 | Cade |
| 5,794,712 A | 8/1998 | Phillips |
| 5,881,820 A | 3/1999 | Baker |
| 6,484,812 B1 | 11/2002 | Clark |
| 7,607,489 B2 | 10/2009 | Kelly et al. |
| D615,107 S | 5/2010 | Kelly et al. |

(Continued)

FOREIGN PATENT DOCUMENTS

| | | |
|---|---|---|
| SU | 745395 A | 7/1980 |
| SU | 982551 A | 12/1982 |
| SU | 1523061 A2 | 11/1989 |

OTHER PUBLICATIONS

Author Unknown, Fast MOvers SA 2009, "Kelly Grows on US Demand," Business South Australia, p. 78, from http://www.kellyharrows.com/downloads/.

(Continued)

*Primary Examiner* — Jamie L McGowan
(74) *Attorney, Agent, or Firm* — Kirby B. Drake; Klemchuk Kubasta LLP (57) ABSTRACT

The present disclosure generally provides systems for adjusting tension and positioning of a harrowing chain. Systems may include a tension adjustment assembly, and the tension adjustment assembly may include a pivot assembly and/or a cylinder hydraulic assembly. Modifications also may be made to the frame of an agricultural implement to address transport issues related to harrowing chains. Further modifications to exterior harrowing chains may be made to reduce the number of small ditches formed in a field due to digging by harrow disks of the chains.

5 Claims, 7 Drawing Sheets

(56) References Cited

U.S. PATENT DOCUMENTS

| | | | |
|---|---|---|---|
| D615,108 S | 5/2010 | Kelly et al. |
| D615,562 S | 5/2010 | Kelly et al. |
| D624,938 S | 10/2010 | Kelly et al. |
| D628,600 S | 12/2010 | Hicks |
| 7,857,073 B2 | 12/2010 | Kelly et al. |

OTHER PUBLICATIONS

Author Unknown, Count on the Kelly Diamond Harrow: Versatility Aids Crop Productivity, from http://www.kellyharrows.com/downloads/.

Author Unknown, Kelly Diamond Harrow Proven by Farmers Who Demand Performance, from http://www.kellyharrows.com/downloads/.

Author Unknown, A Special Advertising Report, "Success Came Straight From the Farm Shed," The Australian, Dec. 2, 2010, from http://www.kellyharrows.com/downloads/.

Thompson, Paula, "All the World's A Stage for Kelly," Agribusiness Achievers, Stock Journal, Oct. 28, 2010, p. 21.

Kelly Manufacturing Cp., Phillips 4500 Rotary Harrow, Brochure from http://kellymfg.com/Brochure/brochure.aspx.

Author Unknown, "Kelly Engineering Winning Awards for Eporting to Europe and US," from http://www.adelaidenow.com.au.

* cited by examiner

APPARATUS FOR ADJUSTING TENSION AND POSITIONING OF A HARROWING CHAIN

CROSS REFERENCE TO RELATED APPLICATION

This application is a continuation-in-part of U.S. patent application Ser. No. 12/631,500, filed on Dec. 4, 2009, entitled "Apparatus and Method for Adjusting Tension of a Harrowing Chain," which is incorporated by referenced in its entirety.

TECHNICAL FIELD

The present disclosure generally relates to agricultural equipment, and more specifically to a device that adjusts tension and positioning of harrowing chains of a piece of agricultural equipment.

BACKGROUND

Farmed land, by its nature, undergoes cyclic periods of sowing, growth, and harvest. Sowing, growing, and harvesting of crops require certain conditioning of the soil if successful returns are going to be obtained from the worked area. Conditions left over a farmed area, particularly after harvest, do not normally provide the ideal conditions in which further crops can be sowed. When the main crop is harvested, the soil often includes weeds that need to be destroyed as well as stubble and the like from previous crops requiring uprooting and cutting before any seed can be sowed. Not only does stubble require uprooting or cutting and weeds still need to be killed off, but there is also the further requirement of having the soil leveled such that sowing implements responsible for reintroducing a new crop into the field can do so efficiently and expeditiously. Thus, it may be important to cultivate the surface of the soil. An agricultural implement including a harrowing chain may be used for this purpose. This operation may be distinct in its effect from a ploughing operation, which is typically used for deeper cultivation. Harrowing is often carried out on fields to follow the rough finish left by ploughing operations. The purpose of harrowing is to generally break up clods and lumps of soil and to provide a finer finish, a good tilth, or soil structure that is suitable for seeding and planting operations. Such coarser harrowing may also be used to remove weeds and to cover seed after sowing. Often a harrowing implement is pulled over the land by a tractor. The harrowing implement may be a useful tool for farming rice, corn, wheat, beans, milo, and sunflowers.

Harrowing agricultural implements are common in the art. Examples of harrowing agricultural implements include U.S. Pat. No. 5,881,820 ("Baker") and U.S. patent application Ser. No. 11/765,182 (Pub. No. U.S. 2008-0314606 A1) ("Kelly").

During normal operation, slack may increase in the harrowing chain to the point that it no longer rotates but rather bounces along the ground. Also, harrow disks in the harrowing chain may become dull or broken causing less effective cultivation.

SUMMARY

Embodiments of the present disclosure generally provide systems for adjusting tension in a harrowing chain. Adjustment of the tension of a harrowing chain, for example through hydraulics, may allow a harrow disk or a link in the chain to be safely removed. The system may provide for a tension adjustment assembly, such as a cylinder hydraulic assembly. Such a cylinder hydraulic assembly may include a cylinder operable in combination with an accumulator and a lock valve. A lock valve may hold a preset pressure on the cylinder to obtain and/or maintain a desired amount of tension on a harrowing chain. The accumulator absorbs energy thereby allowing the cylinder act as a shock absorber. The cylinder hydraulic assembly may be contracted to cut out a link, and the harrowing chain may be reattached to continue use of the agricultural implement. Once a harrow disk or link is removed and repaired or replaced, systems according to embodiments of the present disclosure may allow safe reattachment of the harrowing chain, and the tension of the harrowing chain may be adjusted such that it easily returns to its operational position.

At least one saddle may be incorporated into a frame according to an embodiment of the present disclosure. A saddle may have a V-shaped configuration so that a harrowing chain may be lifted and placed into the cradle portion of the saddle and will not slip off the frame while being transported from a field or down a road.

In a further embodiment of the present disclosure, exterior harrowing chains may include lift arms each having a threaded adjustment. Threaded adjustments according to embodiments of the present disclosure may be manipulated to control the height of flaps that hold exterior harrowing chains. By raising the flaps using the threaded adjustments in the lift arms, harrow disks may not dig as deeply into the ground surface during ploughing, thereby reducing the number of small ditches formed in a field.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally may provide systems of safely and efficiently adjusting tension and positioning of a harrowing chain of an agricultural implement. Relieving tension in a harrowing chain may make it safe to remove a harrowing chain from an agricultural implement to address issues with worn or broken harrow disks or links in a harrowing chain. Moreover, the systems of embodiments of the present disclosure may allow tension to be applied to the harrowing chain after it is reattached to the harrowing implement. This tension may be adjusted to return the harrowing chain to its operational position. Additional embodiments of the present disclosure may provide for modifications to the frame of an agricultural implement to address transport issues related to harrowing chains. Further embodiments may modify exterior harrowing chains to reduce the number of small ditches formed in a field due to digging by harrow disks of the chains.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Figure 1:
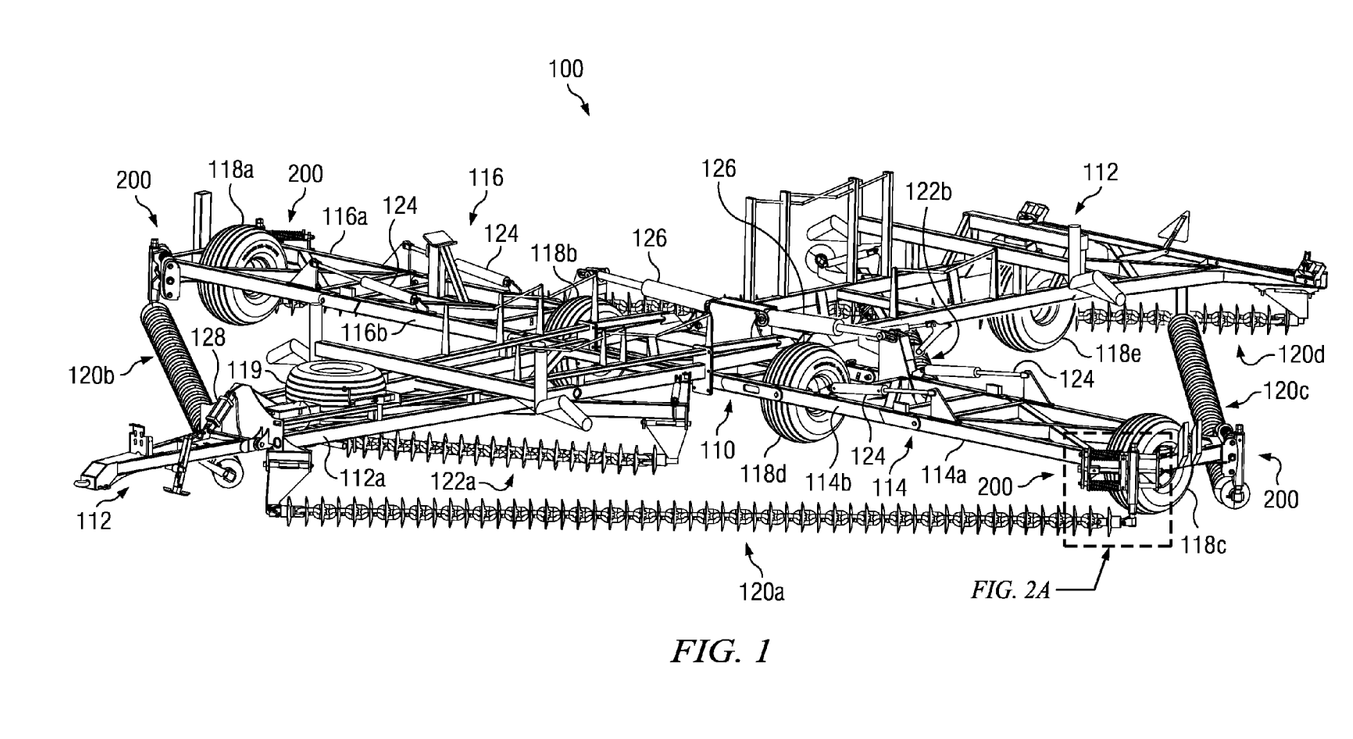
FIG. 1 depicts a perspective view of an agricultural implement according to an embodiment of the present disclosure.

FIG. 1 depicts agricultural implement 100 (which also may be referred to as a harrow device or a chain disk harrow) in accordance with the present disclosure. It should be understood that agricultural implement 100 and elements thereof shown in FIGS. 1-4 are for illustrative purposes only and that any other suitable system or subsystem could be used in conjunction with or in lieu of agricultural implement 100 according to one embodiment of the present disclosure.

FIG. 1 illustrates a perspective view of agricultural implement 100. Agricultural implement 100 includes frame 110, which has central frame portion 112, which includes front central frame portion 112a and rear central frame portion 112b. Frame 110 also defines left frame portion 114 and right frame portion 116, each extending from central frame portion 112. Left frame portion 114 defines exterior left frame portion 114a and interior left frame portion 114b. Similarly, right frame portion 116 also defines exterior right frame portion 116a and interior right frame portion 116b.

Frame 110 may also include a plurality of tires 118. For example, frame 110 may include right exterior tire 118a, right interior tire 118b, left exterior tire 118c, left interior tire 118d, and rear tire 118e. In certain embodiments, spare tire 119 may be also be secured to frame 110. Each of the four tires 118a, b, c, and d may be generally aligned with each other in accordance with an embodiment of the present disclosure, while rear tire 118e may be a single tire located toward the rear of frame 110. Having a single rear tire 118e may be an advantage over dual tire systems in that—dual tire systems may accumulate material between the tires (dirt, mud, foliage, etc) that over time may wear out the tires, wheels, and bearings prematurely resulting in excessive downtime and costly repairs.

Frame 110 may support a plurality of exterior harrowing chains 120 and a plurality of interior harrowing chains 122. First exterior harrowing chain 120a may be supported by frame 110 generally adjacent front central frame portion 112a and exterior left frame portion 114a so that first exterior harrowing chain 120a extends in a first diagonal direction. Second exterior harrowing chain 120b may be supported by frame 110 generally adjacent front central frame portion 112a and exterior right frame portion 116a so that second exterior harrowing chain 120b extends in a second diagonal direction generally opposite the diagonal direction of first exterior harrowing chain 120a. A third exterior harrowing chain 120c may be supported by frame 110 generally adjacent exterior left frame portion 114a and rear central frame portion 112b so that third exterior harrowing chain 120c extends in generally the same diagonal direction as second exterior harrowing chain 120b. A fourth exterior harrowing chain 120d may be supported by frame 110 generally adjacent exterior right frame portion 116a and rear end 112b so that fourth exterior harrowing chain 120d extends in generally the same diagonal direction as first exterior harrowing chain 120a.

In certain embodiments frame 110 may support first interior harrowing chain 122a and second interior harrowing chain 122b. Interior harrowing chains 122a and 122b may ensure that any surface that is not cultivated by any one of exterior harrowing chains 120 is cultivated by interior harrowing chains 122a or b, or interior harrowing chains 122a and b may act as redundant cultivating instruments. First interior harrowing chain 122a may be located generally underneath front central frame portion 112a and extend in a generally diagonal direction that may be approximately parallel to first and fourth exterior harrowing chains 120a and d. Similarly, second interior chain 122b may be located rear of right and left interior tires 118 b and d and extend in an approximately opposite diagonal direction to first interior harrowing chain 122a and may be generally parallel to second and third exterior harrowing chains 120b and c.

Figure 3A:
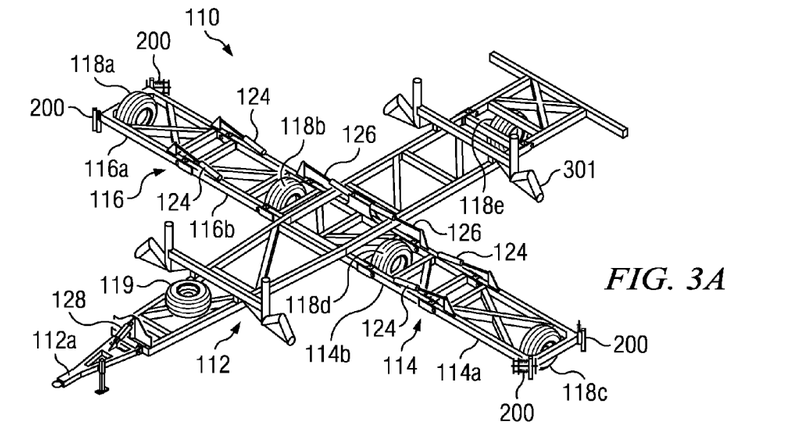
FIGS. 3A-3C depict the hydraulic assisted folding of the agricultural implement of FIG. 1 according to an embodiment of the present disclosure.
Figure 3B:
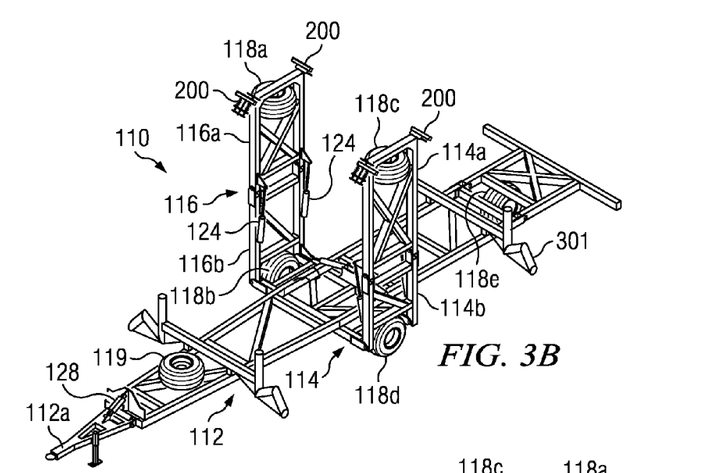
Figure 3C:
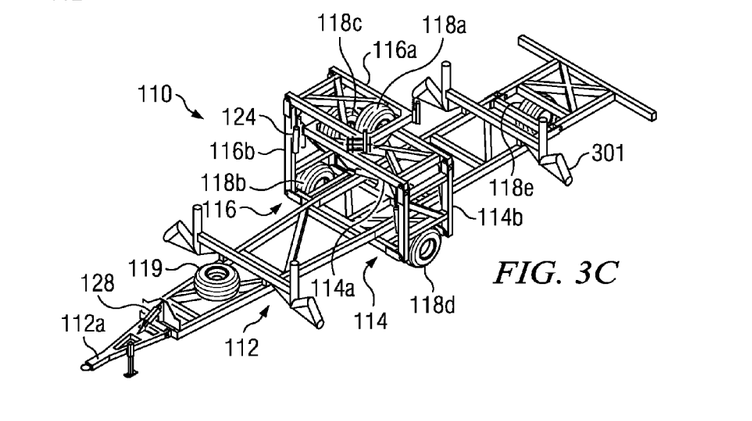

When not in use, agricultural implement 100 may need to be transported along roadways or other narrow passages. To enable this, frame 110 is operable to fold with the assistance of exterior hydraulic cylinders 124, interior hydraulic cylinders 126, front hydraulic cylinder 128, and rear hydraulic cylinder 130. The folding operation is illustrated in FIGS. 3A-3C. In these illustrations, exterior harrowing chains 120 and interior harrowing chains 122a and b have been removed to show the folding operation of frame 110 more clearly. However, in normal use of certain embodiments of the present disclosure the hydraulically assisted folding operation may be accomplished with exterior harrowing chains 120 and interior harrowing chains 122a and b continuing to be supported by the frame 110 while the frame 110 is folded as shown in FIGS. 3A-3C.

In the past, if harrowing chains fell off the frame of an agricultural implement during transport, it was not possible to unfold the plow to issues with the chains. Rather, the chains had a tendency to bend under the frame and accordingly crack or bend the frame, thereby damaging the agricultural implement. Use of saddles 301 as depicted in FIGS. 1 and 3A-3C may reduce, if not eliminate, problems with damage to the frame by the harrowing chains during transport. Saddles 301 formed according to embodiments of the present disclosure may have a V-shaped configuration with a cradle portion for the chains to be placed within during transport. Saddles 301 may be affixed to the frame of an agricultural implement to hold the chain in place during transport. Saddles 301 may be positioned at various junction points on the frame. As an example, saddles 301 may be incorporated onto each side of front central frame portion 112a as well as each side of rear central frame portion 112b as generally depicted in FIG. 1. According to an embodiment of the present disclosure, harrowing chains may swing up and lay within the cradle portion of one or more saddles 301 when the frame is folded for transport. In these embodiments, the harrowing chains may not slip off the frame while being transported from a field or down a road as the cradle portion of saddles 301 is deep enough such that the chain may not slide out even if there are bumps in the road during transport that may jostle the frame.

In certain embodiments, two interior hydraulic cylinders 126 may assist in folding left interior and exterior frame portions 114a and b and right interior and exterior frame portions 116*a* and *b* into a generally vertical position relative to central frame portion 112, as shown in FIG. 3B. To complete the folding operation, four exterior hydraulic cylinders 124 may be used to assist in folding left and right exterior frame portions 114*a* and 116*a* an additional ninety degrees relative to the respective left and right interior frame portions 114*b* and 116*b*. To facilitate clearance of each exterior tire 118*a* and *c*, one of either the left or the right exterior frame portions 114*a* or 116*a* may be longer than the other. Likewise, one of either the left or the right interior frame portions 114*b* or 116*b* may also be longer than the other. Similarly, to make transport easier, front and rear hydraulic cylinders 128 and 130 may assist these portions of frame 110 to also be folded as shown in FIG. 3C.

Figure 2A:
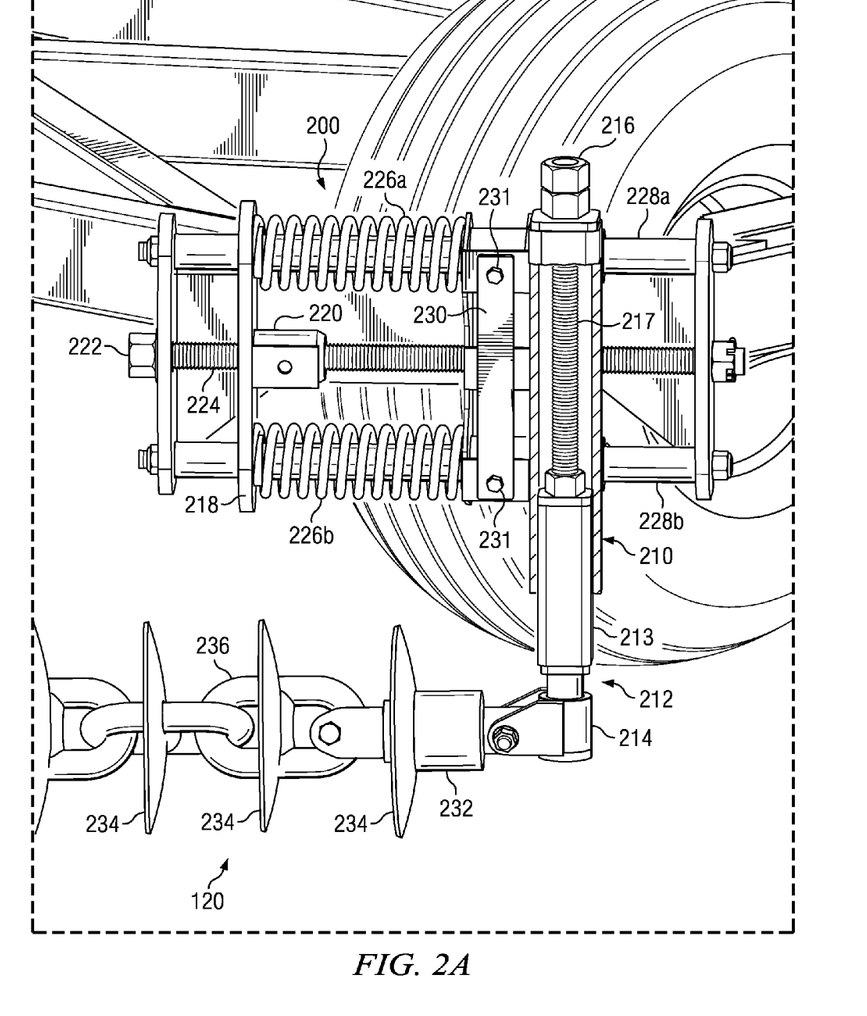
FIG. 2A depicts the tension adjustment assembly shown in FIG. 1 in a first configuration according to an embodiment of the present disclosure.
Figure 2B:
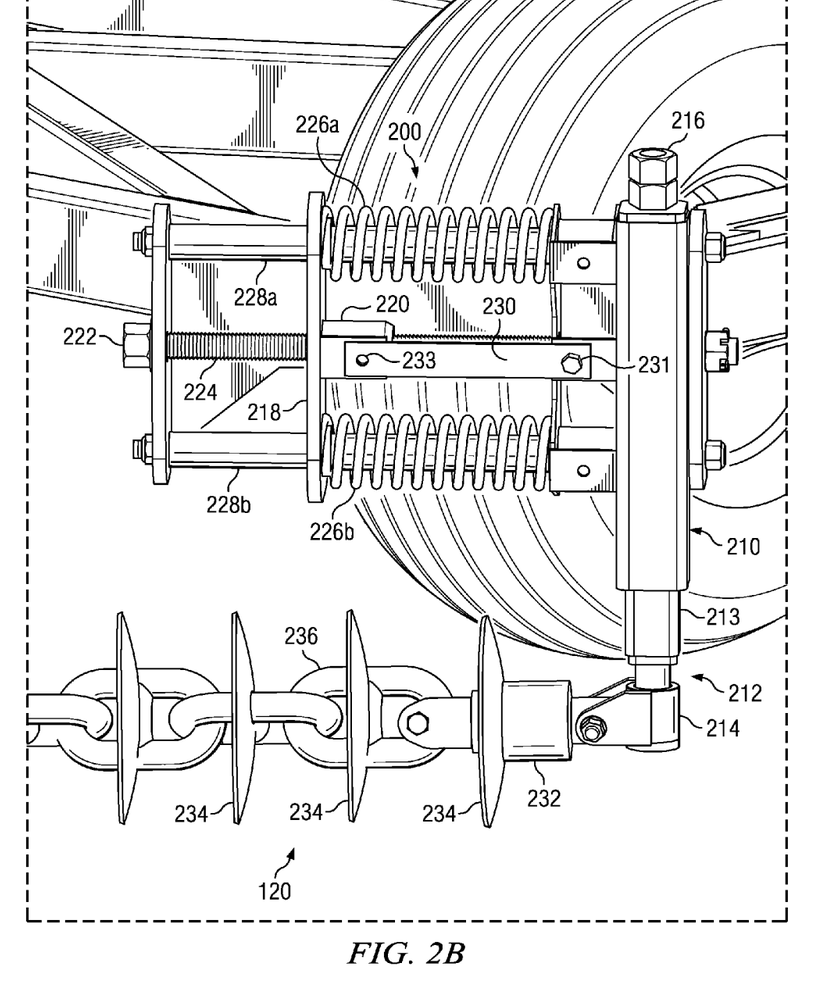
FIG. 2B depicts the tension adjustment assembly shown in FIG. 1 in a second configuration according to an embodiment of the present disclosure.

Each exterior harrowing chain 120 may be joined at one end to tension adjustment assembly 200. An embodiment of tension adjustment assembly 200 is shown in FIGS. 2A and 2B. Tension adjustment assembly 200 may be used to adjust the tension in the respective exterior harrowing chain 120 attached to it. Tension adjustment assembly 200 may also be aligned with the respective harrowing chain 120 to which it is attached. Adjustment of the tension may allow exterior harrowing chain 120 to be removed if it develops too much slack or if link 236 or harrow disk 234 in harrowing chain 120 becomes damaged or broken or otherwise needs to be removed to improve the operation of agricultural implement 100.

Tension adjustment assembly 200 may include slider assembly 210, compression plate 218, and upper spring 226*a* and lower spring 226*b* located between compression plate 218 and slider assembly 210. Horizontal movement of slider assembly 210 either through application of a spring force or other operation may increase or decrease the tension in exterior harrowing chain 120. In certain tension adjustment operations, application of a force may be negative or positive, resulting in an increase or decrease in the tension of exterior harrowing chain 120. Slider assembly 210 may include bearing surfaces that allow it to slide horizontally along upper slider bar 228*a* and lower slider bar 228*b*.

Slider assembly 210 may also include height adjustment assembly 212. Rotating height adjustment nut 216 may rotate threaded height adjustment rod 217, which may raise or lower height adjustment member 213, which may be coupled to U-joint 214. Exterior harrowing chain 120 may also be coupled to U-joint 214 such that it will be raised or lowered when height adjustment nut 216 is rotated.

As previously stated, tension adjustment assembly 200 may include compression plate 218. In certain embodiments, compression plate 218 may include lug 220 having a threaded interior diameter that cooperates with horizontal threaded rod 224. For example, rotating compression adjustment nut 222 will rotate horizontal threaded rod 224 causing compression plate 218 to move horizontally along horizontal threaded rod 224. This horizontal movement of compression plate 218 may increase or decrease the force upper and lower springs 226*a* and 226*b* exert on slider assembly 210 and the corresponding force slider assembly 210 exerts on exterior harrowing chain 120. Thus, rotating compression adjustment nut 222 will either increase or decrease the tension in exterior harrowing chain 120.

In certain tension adjustment operations, harrowing chain 120 may have developed enough slack to allow compression adjustment nut 222 to be rotated such that slider assembly 210 moves linearly to its furthest location away from compression adjustment nut 222. At this point, spring-preset bar 230 may be removed from its vertical position on slider assembly 210 and reattached to tension adjustment assembly 200 in a horizontal position (as shown in FIG. 2B), with one end attached to compression plate 218 and the other end attached to slider assembly 210. In certain embodiments of the present disclosure, spring-preset bar 230 may not be a bar, but rather may be any horizontal member suitable for joining compression plate 218 and slider assembly 210.

The spring-preset bar may be secured in its horizontal position with fasteners 231 used to secure it in its vertical position. Fasteners 231 may be received by spring-preset bar holes 233. Fasteners 231 may be a bolt, pin, rivet, screw, and the like. In one embodiment, fasteners 231 may be half-inch bolts and spring-preset bar holes 233 may be five-eighths in diameter and approximately twelve inches apart from center to center. Once spring-preset bar 230 is secured in this position, rotating compression adjustment nut 222 will cause compression plate 218 and slider assembly 210 to move as a single unit and relieve the tension in harrowing chain 120. Relieving this tension may allow harrowing chain 120 to be safely removed and harrow disk 234 and/or link 236 to also be removed reducing the length of harrowing chain 120. After removing harrow disk 234 and/or link 236, harrowing chain 120 may be reattached to agricultural implement 100 and springs 226*a* and 226*b* may be set at a predetermined spring force. This may be accomplished by adjusting the tension in harrowing chain 120 such that spring-preset bar 230 becomes loose in its horizontal orientation. Because spring-preset bar holes 233 may be slightly larger than fasteners 231, at a predetermined tension upper and lower springs 226*a* and *b* will take the load and cause spring-preset bar 230 to become loose. At this point, spring-preset bar 230 may be removed from its horizontal position on tension adjustment assembly 200 and reattached to slider assembly 210 in its original vertical position (as shown in FIG. 2A).

Also shown in more detail in FIG. 2A are components of exterior harrowing chain 120 according to an embodiment of the present disclosure. The respective exterior harrowing chains 120 may include harrow disks 234 coupled to link 236 in exterior harrowing chain 120. Harrow disks 234 may be made of abrasive resistant high strength steel. Harrow disks 234 may have a concave side and a convex side. The concave side of each harrow disk 234 may be oriented generally toward the front of frame 110, and thus be generally oriented more in a direction of travel of agricultural implement 100. Accordingly, the convex side of each harrow disk 234 may be generally oriented toward the rear of frame 110, and thus more away from a direction of travel of agricultural implement 100. In certain embodiments, interior harrowing chains 122*a* and *b* may include some or all of the same components as exterior harrowing chains 120 oriented in a similar fashion. Bearing 232 may couple each slider assembly 210 to the respective end of each exterior harrowing chain 120 to allow each exterior harrowing chain 120 to rotate with respect to its respective slider assembly 210.

Figure 2C:
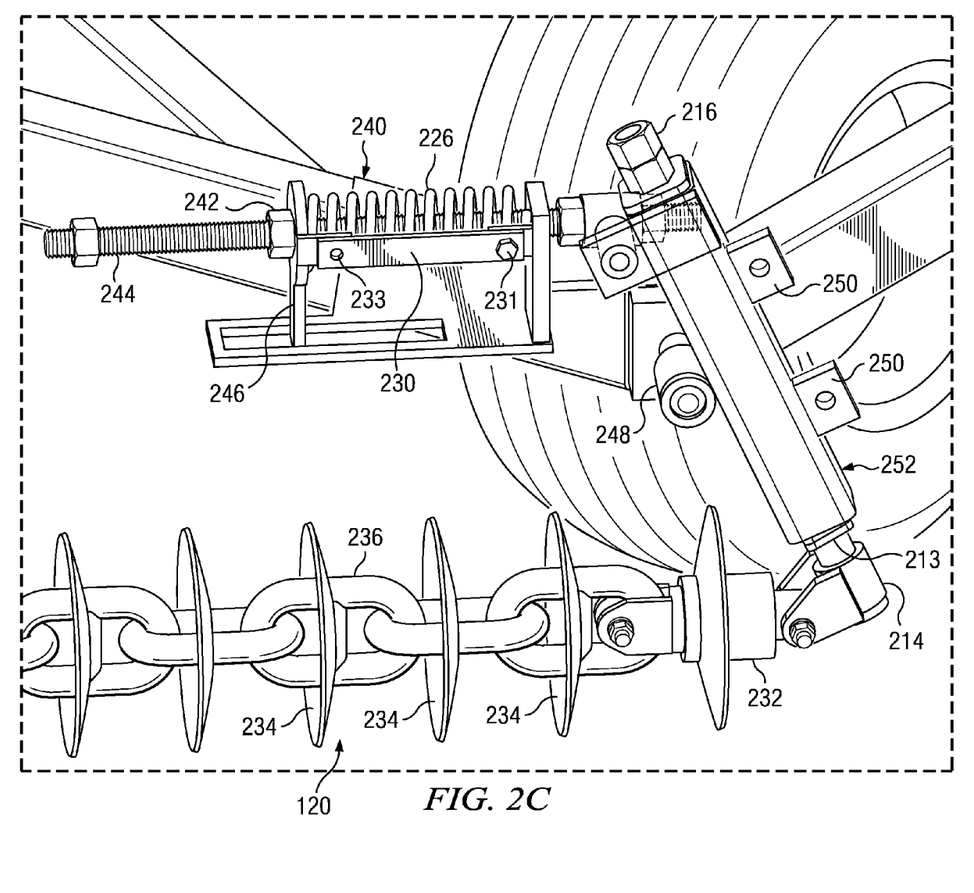
FIG. 2C depicts an alternate embodiment of a tension adjustment assembly according to embodiments of the present disclosure.

A detail of an alternate embodiment of tension adjustment assembly 240 is shown in FIG. 2C. This embodiment 240 may be employed in addition to or in lieu of tension adjustment assembly 200 on agricultural implement 100. Tension adjustment assembly 240 may be used to adjust the tension in the respective exterior harrowing chain 120 attached to it. Tension adjustment assembly 240 may also be aligned with the respective harrowing chain 120 to which it is attached. The tension adjustment assembly may operate similarly to the tension adjustment assembly shown in FIGS. 2A and 2B, except pivot assembly 252 may be used in lieu of slider assembly 210. Pivot assembly 252 may be similar to slider assembly 210 with respect to its vertical adjustment operation and its coupling to the respective exterior harrowing chain 120. However, rather than sliding horizontally to adjust the tension in exterior harrowing chain 120, pivot assembly 252 may rotate about pivot support 248 that may be coupled to frame 110.

When the tension in the respective harrowing chain 120 is adjusted, compression adjustment nut 242 may be rotated to move compression member 246 generally horizontally along threaded rod 244. Compression member 246 may include a lock tab to ensure its generally horizontal movement. In normal operation, spring 226 may carry the tension load of exterior harrowing chain 120. However, when performing tension adjustment in accordance with the teaching of the present disclosure, spring-preset bar 230, fasteners 231, and spring-preset bar holes 233 may function as herein described with respect to the embodiment shown in FIGS. 2A and 2B. Once the tension adjustment operation has been performed and agricultural implement 100 is ready to resume normal operation, spring 226 may take the tension load of the respective exterior harrowing chain 120 by removing spring-preset bar 230. Spring-preset bar 230 may then be secured to a pair of tabs 250 coupled to pivot assembly 252.

Figure 2D:
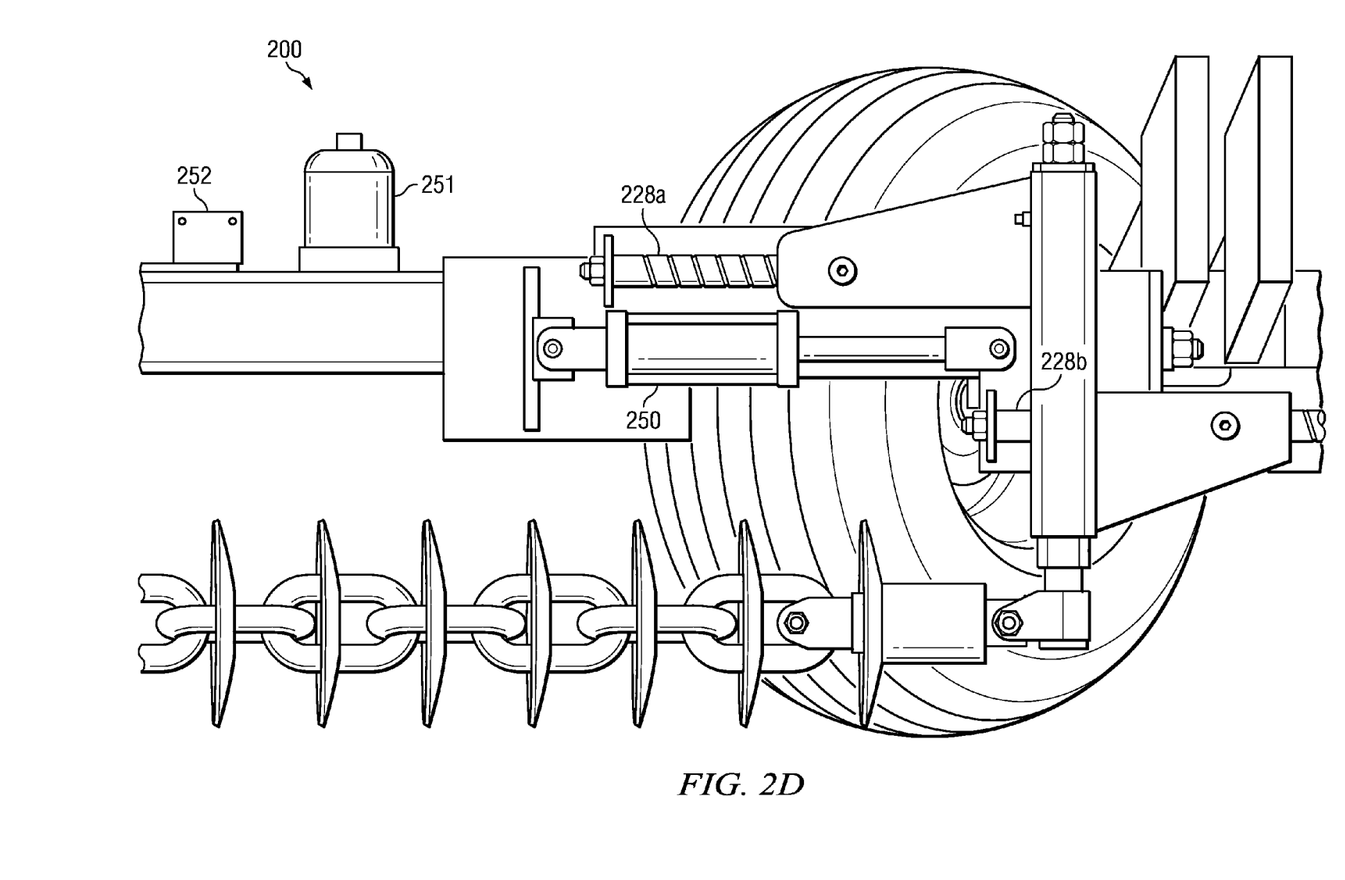
FIG. 2D depicts another embodiment of a tension adjustment assembly according to embodiments of the present disclosure.

Another embodiment of the present disclosure modifies tension adjustment assembly 200 as depicted in FIG. 2A to replace horizontal threaded rod 224, compression adjustment nut 222, compression plate 218, lug 220, upper and lower springs 226a and b, spring-preset bar 230 and fasteners 231 with a cylinder hydraulic assembly. Such a cylinder hydraulic assembly is depicted in FIG. 2D. A cylinder hydraulic assembly according to embodiments of the present disclosure may include at least cylinder 250, accumulator 251 and lock valve 252. Accumulator 251 along with lock valve 252 and cylinder 250 acts as a spring-like assembly to adjust tension in a harrowing chain. Using cylinder 250, tension adjustment assembly 200 may use hydraulic pressure from the agricultural implement to preset the spring-like assembly. Accumulator 251 may absorb energy, allowing cylinder 250 to act as a shock absorber. Lock valve 252 may hold a preset pressure on the cylinder hydraulic assembly in order to maintain a desired tension in a harrowing chain. Tension adjustment provided by a cylinder hydraulic assembly formed according to embodiments of the present disclosure may allow relief of tension in a harrowing chain such that a harrow disk that has become dull or broken may be safely removed through hydraulics. Cylinder 250 may be contracted, for example, to replace or repair a chain link or harrow disk of a harrowing chain. Once the link or disk has been replaced or repaired, the harrowing chain may be reattached to continue use of the agricultural implement. Further, when the frame of an agricultural implement is folded, cylinder 250 may be retracted to slack the harrowing chain allowing the frame to fold more easily without damaging the frame.

In use, frame 110 may be pulled across a ground surface (e.g., a field used for farming) by a tractor or another appropriate pulling device. Exterior harrowing chains 120 and interior harrowing chains 122a and 122b may act to level the ground surface and additionally break up the ground surface without dragging and removing all of the topsoil. More particularly, exterior harrowing chains 120 and interior harrowing chains 122a and b may rotate as they interact with the ground surface causing harrow disks 234 to rotate and cut through the ground surface. The arrangement of the concave portions of harrow disks 234 may allow parts of the ground surface to pass through exterior harrowing chains 120 and interior harrowing chains 122a and b rather than simply being dragged along, as typically results when conventional chains are pulled across a ground surface.

Figure 4:
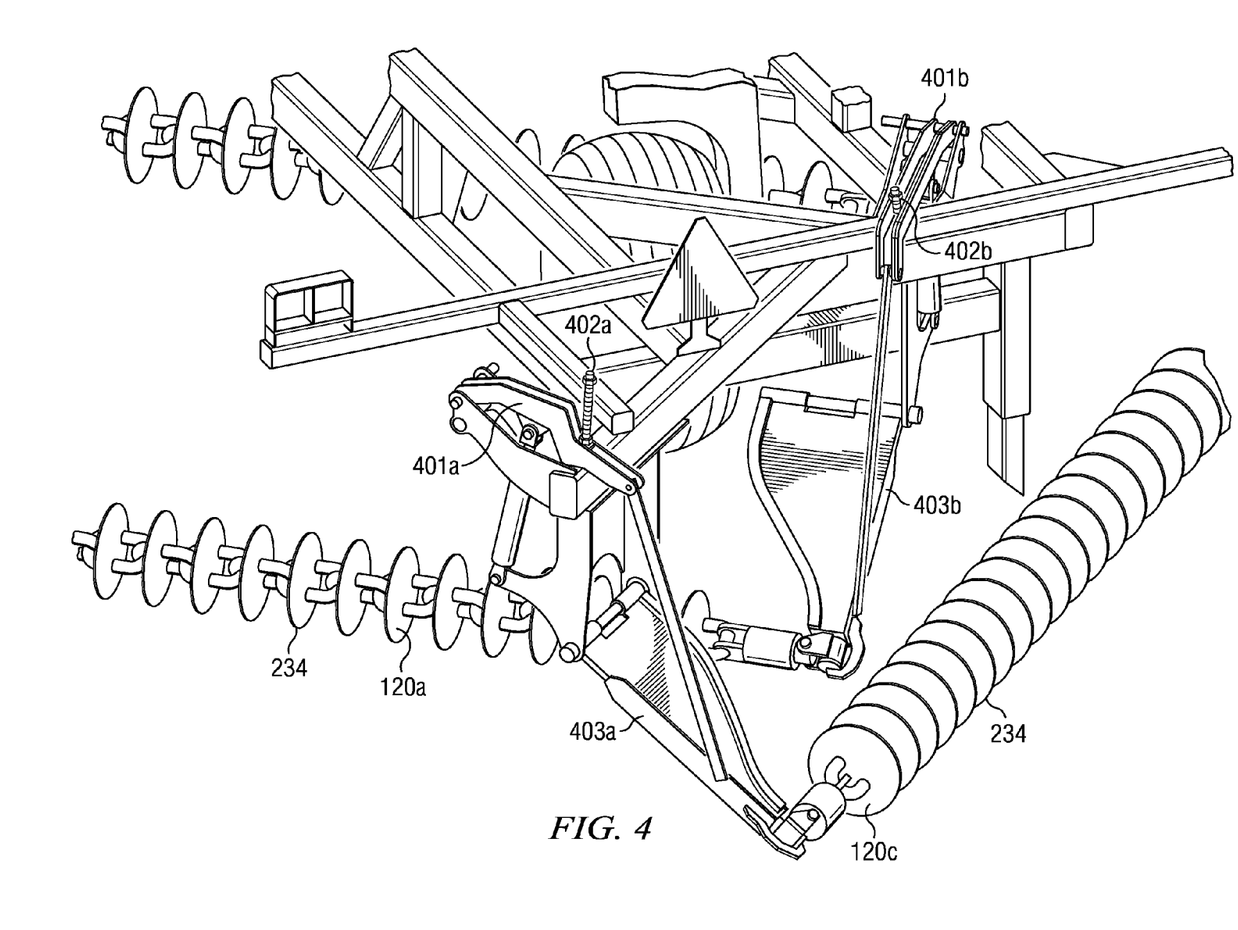
FIG. 4 depicts an exterior harrowing chain assembly according to an embodiment of the present disclosure.

FIG. 4 depicts an exterior harrowing chain assembly according to an embodiment of the present disclosure. As previously addressed, exterior harrowing chains, such as first exterior harrowing chain 120a and third exterior harrowing chain 120c as generally depicted in FIG. 1, may level the ground surface. However, small ditches may develop during ploughing when harrow disks dig into the ground surface as the harrowing chain moves along the surface. This particularly may occur when exterior harrowing chains, such as chains 120a and 120c, throw dirt off to the side as the chains move across the ground surface, and nothing covers up the dirt, thereby creating a ditch. In order to reduce or eliminate these small ditches that may form, exterior harrowing chains 120a, 120c may be equipped with lift arms 401a, 401b respectively. Lift arms 401a and 401b each include threaded adjustment 402a, 402b respectively. Threaded adjustment 402a accordingly may adjust and control the height of flap 403a that holds first exterior harrowing chain 120a. Similarly, threaded adjustment 402b may adjust and control the height of flap 403b that holds third exterior harrowing chain 120c. By slightly raising flaps 403a, 403b, harrow disks 234 on each of first and third exterior harrowing chains 120a, 120c, may not dig into the ground surface as deeply. Accordingly, the number of small ditches that may arise as the exterior harrowing chain moves across the ground surface may be reduced. It should be appreciated that while the embodiment depicted in FIG. 4 describes an implementation related to first and third exterior harrowing chains 120a, 120c, any exterior harrowing chains that may be supported by a frame may be equipped with lift arms and threaded adjustments without departing from the present disclosure.

While this disclosure has described certain embodiments and generally associated methods, alterations and permutations of these embodiments and methods may be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for adjusting tension in a harrowing chain, said apparatus comprising:
    a harrowing chain having a first end; and
    tension adjustment assembly, comprising:
        a pivot assembly having a first end coupled to the first end of the harrowing chain, the pivot assembly configured to rotate about a pivot support coupled to a frame;
        a threaded rod;
        a compress member:
        a compression adjustment nut, wherein the compression adjustment nut is configured to rotate to move the compression member generally horizontally along the threaded rod; and
        a spring-preset bar configured to join the compression member to the pivot assembly in a first orientation.

2. The apparatus of claim 1, the compression member further comprising:
    a lock tab to ensure generally horizontal movement of the compression member.

3. The apparatus of claim 1, further comprising:
    a first spring configured to apply a spring force to the pivot assembly.

4. The apparatus of claim 1, wherein the spring-preset bar is removable and removing the spring-preset bar separates the compression member from the pivot assembly, the spring-preset bar being further configured to reattach to the tension adjustment assembly in a second orientation.

5. The apparatus of claim 1, wherein the spring-preset bar is securable to a pair of tabs coupled to the pivot assembly.

* * * * *